Sept. 6, 1932.　　　J. W. TAYLOR　　　1,875,955
WEIGHING APPARATUS
Filed May 18, 1929　　2 Sheets-Sheet 1
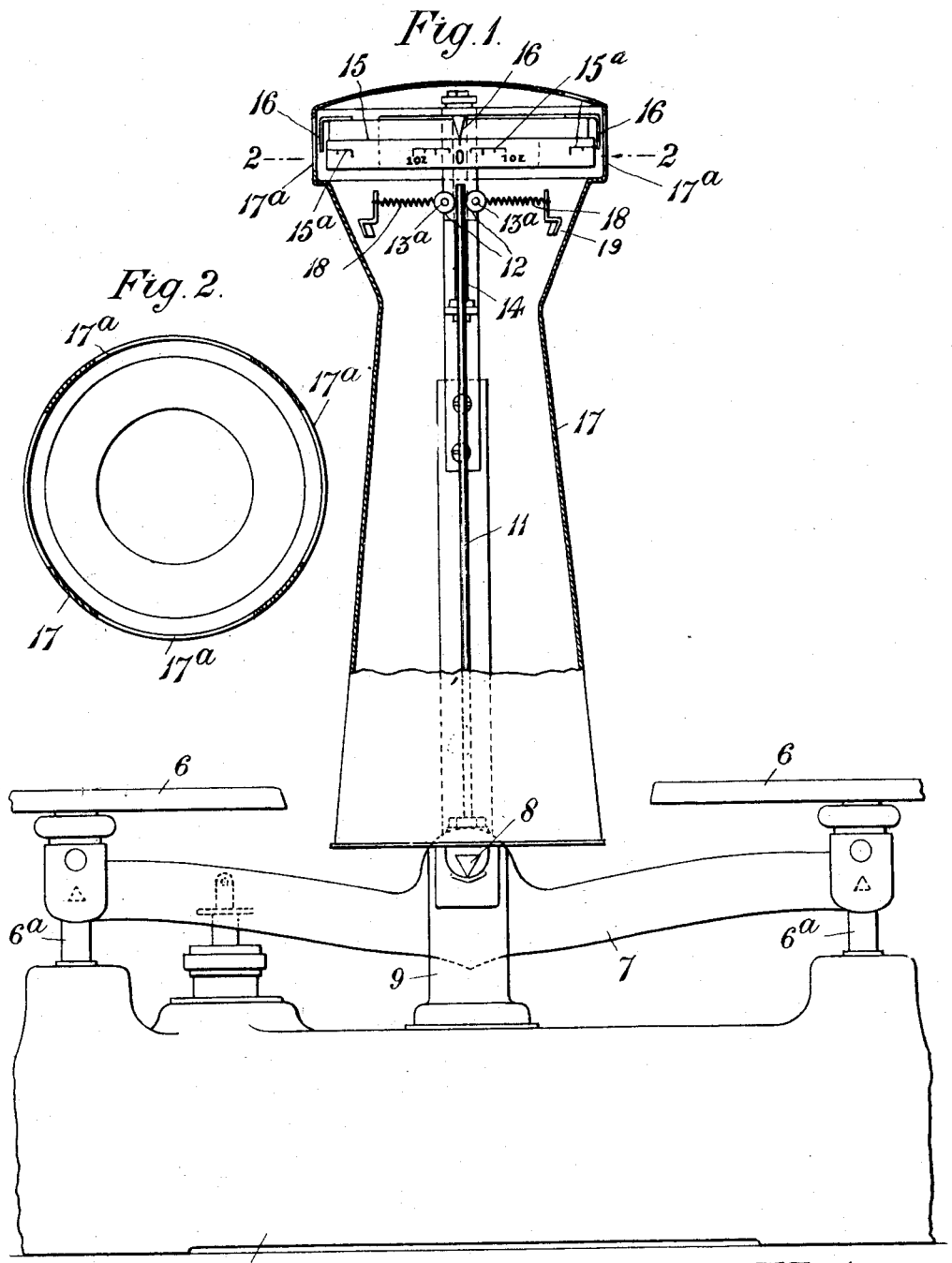
Inventor,— John W. Taylor
by George E. Folkes.
his Attorney Sept. 6, 1932.  J. W. TAYLOR  1,875,955
WEIGHING APPARATUS
Filed May 18, 1929   2 Sheets-Sheet 2
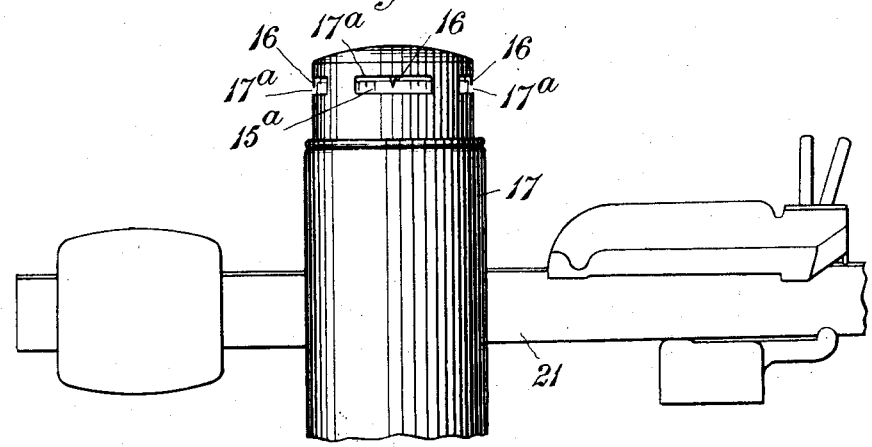
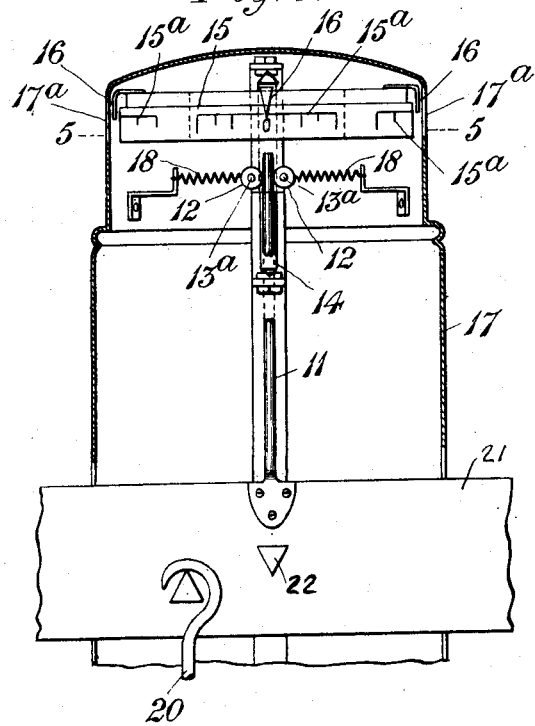
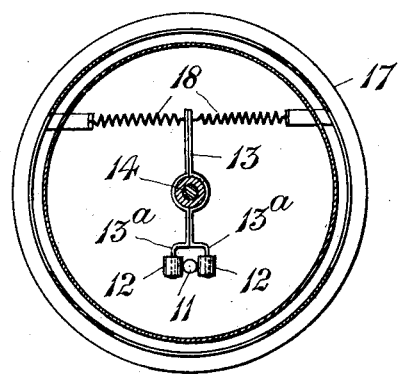
*Inventor:—*
*John W. Taylor*
by *George E. Folkes.*
*his Attorney*

Patented Sept. 6, 1932

1,875,955

UNITED STATES PATENT OFFICE

JOHN WILLIAM TAYLOR, OF SOHO FOUNDRY, BIRMINGHAM, ENGLAND, ASSIGNOR TO W. & T. AVERY LIMITED, OF BIRMINGHAM, ENGLAND

WEIGHING APPARATUS

Application filed May 18, 1929. Serial No. 364,261.

This invention has reference to improvements in or relating to weighing apparatus and has for its object the provision of an improved indicating mechanism for weighing apparatus which admits of the simultaneous observation from two or more points of the position of equi-poise of the weighbeam or of a lever of the weighing system.

The invention consists of an improved, weighing apparatus wherein the position of equi-poise of the weighbeam steelyard or of a lever of the weighing system is determined by means of an indicating mechanism disposed within a housing or pillar and connected to the weighing system the indicator of the said mechanism being observable simultaneously from three or more points.

The invention will now be described with particular reference to the accompanying sheets of drawings, wherein:—

Figure 1 is a part sectional front elevation illustrating, somewhat diagrammatically, the invention as applied to a counter weighing scale of known construction.

Figure 2 is a sectional plan of the indicator housing of the scale seen in Figure 1 the section being taken on the plane indicated by the line 2—2 in the said figure.

Figure 3 represents diagrammatically and in front elevation, with parts omitted where desirable, the invention as applied to a steelyard weighing apparatus of known construction sufficient only of the weighing apparatus being shown as is necessary to an understanding of the invention.

Figure 4 is a fragmentary view, mainly in vertical section, of the indicating mechanism and parts of the steelyard of the weighing apparatus illustrated in Figure 3, and with parts omitted where desirable, Figure 5 is a sectional plan of the indicator housing and indicating mechanism seen in Figure 4 the section being taken on the plane indicated by the line 5—5 in the said figure.

In the drawings like numerals of reference indicate similar parts in the several views.

Referring first more particularly to the construction illustrated in Figures 1 and 2, the scale pans 6 are mounted on the opposite ends of an even armed weighbeam 7 which is fulcrumed on a knife-edge 8 supported in bearings carried by standards 9 secured to or cast integral with the upper side of a base housing 10 the supports for the scale pans 6 being provided with legs 6ª the lower portions whereof depend within the housing 10 and are interconnected adjacent to their lower ends by means of a parallel motion stay (not shown) in known manner.

Secured to the weighbeam 7 and normally disposed with its axis in the vertical plane passing through the knife-edge 8 when the weighbeam is in the position of equi-poise is a vertical rod 11 the upper end whereof is disposed intermediate and in sliding contact with the peripheries of a pair of rollers 12 mounted on the jawed ends 13ª of a member 13 (see Figure 5) fixed on a vertical spindle 14 which is rotatably mounted at each end in cone point and cup bearings. Fixed to the spindle 14 is a horizontally disposed drum 15 the periphery whereof is graduated with four identical and symmetrically disposed sets of weight graduations 15ª which register with fixed pointers 16 symmetrically disposed within the upper portion of a housing 17 supported from the standards 9. The pointers 16 and the sets of graduations 15ª are observable through windows 17ª formed in the upper portion of the housing 17 said windows being disposed symmetrically relatively to the respective pointers 16. The pointers 16 are secured to an annular ring which is concentric with but of lesser diameter than the drum carrying the sets of weight graduations 15ª the aforesaid ring being fixed to the walls of the housing 17.

Secured to a rearward extension of the member 13 are a pair of oppositely disposed coil springs 18 which serve as part of the weighing resistant said springs being anchored at their other ends to brackets 19 fixed to the housing 17 and being adjusted initially so as to maintain the correct weight graduations of the indicator drum 15 in register with the respective pointers 16.

The operation of the scale is as follows:—

Upon an oscillation of the weighbeam 7 the rod 11 is rocked and caused to bear on the peripheries of the rollers 12 and thereby to impart a rotary movement to the indicator drum 15 against the resistance of the coil springs 13 the position of equi-poise of the weighbeam 7 being visible simultaneously from four positions through the windows 17ª.

It will be appreciated that with a weighing scale constructed as hereinbefore described the position of equi-poise of the weighbeam is observable simultaneously at four points at right angles to one another and hence the scale is readily adaptable for use with the axis of the weighbeam parallel to or at right angles to the longitudinal axis of the counter without involving any rotation of the indicator housing as is usually necessary with scales of the known kind and wherein it is desired to convert an ordinary scale for use as a cross counterscale.

Referring now to the embodiment of the invention illustrated in Figures 3 to 5 the weighing apparatus shown therein diagrammatically is of the kind wherein the load is placed on a weighing platform (not shown) which is supported on a lever system which in turn has connection through a rod 20 to a steelyard 21 fulcrumed on a knife-edge 22 mounted in bearings (not shown) supported from a tubular pillar or housing.

Screwed to the steelyard 21 and with its axis in the vertical plane passing through the knife-edge 22 when the steelyard is in the equilibrium position is a rod 11 which actuates an indicating mechanism constructed and adapted for use in a manner similar to that illustrated and described with reference to Figures 1 and 2.

It will be seen that with a steelyard weighing apparatus constructed as hereinbefore described the position of equi-poise of the steelyard 21 is observable simultaneously from four points thereby permitting of a ready observation of the indicating mechanism without inconvenience to the operator or customer regardless of the location of the weighing apparatus.

What I claim is:—

1. In a weighing apparatus, a rotatable indicating mechanism provided with more than two similar sets of indicating means, fixed indicating means adapted to co-operate with the indicating means provided on the rotatable indicating mechanism, a weighing lever, means for transmitting the movement of the said lever to the rotatable indicating mechanism for effecting a rotation thereof in correspondence with the movement imparted to the lever and a housing for the indicating mechanism which admits of the simultaneous observation of the position of equipose of the weighing lever as denoted by the said indicating means from more than two points.

2. A weighing apparatus comprising a weighing lever, a housing, an indicator rotatably mounted within said housing, means for communicating the movement of the weighbeam to the indicator for effecting a rotation thereof in correspondence with the movement imparted to the weighbeam, a plurality of indicating means provided on said indicator, a plurality of fixed indicating means supported from the housing and adapted to cooperate with the indicating means provided on the indicator and windows formed in the said housing and adapted to admit of the simultaneous observation of the indicating means from more than two positions.

3. A weighing apparatus comprising a weighing lever, a vertically disposed housing, a rotary drum indicator mounted within said housing, means for indicating the movement of the weighbeam to the drum indicator, more than two indicating means provided on the periphery of the said drum, more than two fixed indices supported from the housing and adapted to cooperate with the indicating means provided on the drum indicator, means for resisting the rotation of the drum and windows formed in the housing admitting of the simultaneous observation of the position of equi-poise of the weighing lever as denoted by the said indicating means from more than two positions.

4. A weighing apparatus comprising a weighing lever, a housing, a vertically disposed rod secured to the weighbeam and with its axis in the vertical plane passing through the fulcrum of the weighing lever when the said lever is in a position of equi-poise, a rotary drum indicator mounted on a vertical axis and located within the housing, a member carried by the drum indicator and in operative connection with the aforesaid rod whereby the movements imparted to the said rod upon the oscillations of the weighbeam are caused to effect a rotation of the drum indicator, more than two similar sets of indicating means provided on the periphery of the drum indicator, more than two fixed indicating means supported from the housing and adapted to co-operate with the indicating means provided on the drum indicator and a plurality of windows formed in the said housing which admit of the simultaneous observation of the position of equi-poise of the weighing lever as denoted by the aforesaid indicating means from more than two positions.

In testimony whereof, I have signed my name to this specification.

JOHN WILLIAM TAYLOR.